(12) United States Patent
Yang et al.

(10) Patent No.: US 11,099,422 B2
(45) Date of Patent: Aug. 24, 2021

(54) REFLECTIVE FILTER COMPRISING A PERIODIC ARRAY STRUCTURE HAVING AN EQUIVALENT REFRACTIVE INDEX AND DISPLAY PANEL HAVING THE SAME, DISPLAY DEVICE AND CONTROL METHOD THEREOF

(71) Applicant: BOE TECHNOLOGY GROUP CO., LTD., Beijing (CN)

(72) Inventors: Song Yang, Beijing (CN); Ming Zhu, Beijing (CN); Shiyu Zhang, Beijing (CN); Zheng Fang, Beijing (CN); Haijun Niu, Beijing (CN); Ge Shi, Beijing (CN); Yujie Liu, Beijing (CN); Jiahui Han, Beijing (CN); Yuyao Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/764,209

(22) PCT Filed: Dec. 11, 2019

(86) PCT No.: PCT/CN2019/124472
§ 371 (c)(1),
(2) Date: May 14, 2020

(87) PCT Pub. No.: WO2020/140702
PCT Pub. Date: Jul. 9, 2020

(65) Prior Publication Data
US 2021/0232002 A1 Jul. 29, 2021

(30) Foreign Application Priority Data
Jan. 3, 2019 (CN) .......................... 201910003820.9

(51) Int. Cl.
*G02F 1/1335* (2006.01)
*G02F 1/13363* (2006.01)
(Continued)

(52) U.S. Cl.
CPC ......... *G02F 1/133553* (2013.01); *G02B 5/26* (2013.01); *G02F 1/13363* (2013.01);
(Continued)

(58) Field of Classification Search
CPC ........... G02F 1/133502; G02F 2203/02; G02F 1/133521; G02F 1/195; G02F 2201/307;
(Continued)

(56) References Cited

U.S. PATENT DOCUMENTS

2002/0097358 A1* 7/2002 Ueki ................. G02F 1/133504
349/113
2005/0213001 A1 9/2005 Ueki et al.
(Continued)

FOREIGN PATENT DOCUMENTS

CN 1353325 A 6/2002
CN 101697021 A 4/2010
(Continued)

OTHER PUBLICATIONS

Li et al., "Design of reflection and transmission guided mode resonance filters", Vacuum, Mar. 2015, pp. 18-21, vol. 52, No. 2, DOI: 10.13385/j.cnki.vacuum.2015.02.05.

*Primary Examiner* — Paul C Lee
(74) *Attorney, Agent, or Firm* — The Webb Law Firm

(57) ABSTRACT

The present disclosure relates to a display panel, a display device, a reflective filter and a control method thereof. The reflective filter includes: a substrate; a first dielectric layer having a first refractive index, and located on one side of the substrate; a periodic array structure located on one side of the first dielectric layer away from the substrate and in direct
(Continued)

contact with the first dielectric layer, wherein the periodic array structure includes a plurality of solid material patterns spaced apart by gaps; and a second dielectric layer covering the periodic array structure and filling the gaps, wherein a material of the second dielectric layer is a variable refractive index material; wherein the first refractive index of the first dielectric layer is lower than an equivalent refractive index $n_{neff}$ of the periodic array structure with the gaps filled with the variable refractive index material.

20 Claims, 3 Drawing Sheets

(51) Int. Cl.
*G02B 5/26* (2006.01)
*G02F 1/1333* (2006.01)

(52) U.S. Cl.
CPC .. *G02F 1/133345* (2013.01); *G02F 1/133504* (2013.01); *G02F 2201/307* (2013.01); *G02F 2203/02* (2013.01)

(58) Field of Classification Search
CPC . G02F 2201/346; G02F 1/13478; G02B 5/26; G02B 2006/12109; G02B 27/0977
See application file for complete search history.

(56) References Cited

U.S. PATENT DOCUMENTS

| | | | |
|---|---|---|---|
| 2008/0291525 A1 | 11/2008 | Kim et al. | |
| 2014/0185142 A1 | 7/2014 | Gupta et al. | |
| 2018/0059472 A1* | 3/2018 | Kim | G02F 1/1393 |
| 2018/0120667 A1* | 5/2018 | Kubota | G02B 5/045 |
| 2019/0011735 A1 | 1/2019 | Tan et al. | |

FOREIGN PATENT DOCUMENTS

| | | | |
|---|---|---|---|
| CN | 102789021 A | 11/2012 | |
| CN | 104903774 A | 9/2015 | |
| CN | 106292124 A | 1/2017 | |
| CN | 106773279 A | 5/2017 | |
| CN | 206515585 U | 9/2017 | |
| CN | 109581565 A | 4/2019 | |
| JP | 2003035901 A | 2/2003 | |
| KR | 1020130016157 A | 2/2013 | |
| WO | WO-2018076860 A1 * | 5/2018 | G02F 1/1334 |

* cited by examiner

REFLECTIVE FILTER COMPRISING A PERIODIC ARRAY STRUCTURE HAVING AN EQUIVALENT REFRACTIVE INDEX AND DISPLAY PANEL HAVING THE SAME, DISPLAY DEVICE AND CONTROL METHOD THEREOF

CROSS-REFERENCE TO RELATED APPLICATIONS

This application is on the United States national phase of PCT/CN2019/124472 filed Dec. 11, 2019, and claims priority to Chinese Patent Application No. 201910003820.9 filed Jan. 3, 2019, the disclosures of which are hereby incorporated by reference in their entirety.

TECHNICAL FIELD

The present disclosure relates to the field of display, and in particular to a display panel, a display device, a reflective filter and a control method thereof.

BACKGROUND

The reflective liquid crystal display (LCD) is a display device that displays by reflection of ambient light. Compared with the transmissive LCD with a backlight source, the reflective LCD has advantages such as high contrast, low power consumption, thin body and light weight, and is favorable for vision protection.

In the related art, the reflective LCD implements color display by an absorptive color film, and implements grayscale control by polarizers and liquid crystals.

SUMMARY

According to one aspect of the present disclosure, a reflective filter is provided. The reflective filter includes: a substrate; a first dielectric layer having a first refractive index and located on one side of the substrate; a periodic array structure located on one side of the first dielectric layer away from the substrate and in direct contact with the first dielectric layer, wherein the periodic array structure includes a plurality of solid material patterns spaced apart by gaps; and a second dielectric layer covering the periodic array structure and filling the gaps, wherein a material of the second dielectric layer is a variable refractive index material, wherein the first refractive index of the first dielectric layer is lower than an equivalent refractive index $n_{neff}$ of the periodic array structure with the gaps filled with the variable refractive index material, and the equivalent refractive index $n_{neff}$ is $$n_{neff} = \sqrt{f \times n_a^2 + (1-f) \times n_v^2},$$

where f is a ratio of a projection area of the solid material patterns of the periodic array structure on the substrate relative to a projection area of an entirety of the periodic array structure on the substrate, $n_a$ is a refractive index of a material of solid material patterns, and $n_v$ is a refractive index of the variable refractive index material.

In some embodiments, the variable refractive index material has a refractive index configured to be adjusted to a second refractive index or a third refractive index, and the first dielectric layer and the periodic array structure are configured such that: in the case where a refractive index of the variable refractive index material is the second refractive index, incident light is enabled to form a reflection peak of a designated color light on a surface of the first dielectric layer adjacent to the periodic array structure; and in the case where the refractive index of the variable refractive index material is the third refractive index, incident light is disenabled to form a reflection peak of a designated color light on a surface of the first dielectric layer adjacent to the periodic array structure.

In some embodiments, the refractive index of the material of the solid material pattern is higher than any one of the second refractive index and the third refractive index.

In some embodiments, the periodic array structure is a two-dimensional periodic array structure, and the first dielectric layer satisfies that:

$$n_1^2 - (\lambda/Py)^2 < 0 \text{ and } n_1^2 - (\lambda/Px)^2 < 0;$$

when the refractive index of the variable refractive index material is the second refractive index, the periodic array structure with the gaps filled with the variable refractive index material satisfies that:

$$n_{neff}^2 - (\lambda/Py)^2 > 0 \text{ or } n_{neff}^2 - (\lambda/Px)^2 > 0;$$

and satisfies that:

$$n_{neff}^2 - (\lambda/Py)^2 - (\lambda/Px)^2 < 0;$$

where Px and Py are respectively periods of the two-dimensional periodic array structure in an x direction and a y direction orthogonal to each other, $\lambda$ is a wavelength of a designated color light, and $n_1$ is the first refractive index of the first dielectric layer.

In some embodiments, the periodic array structure is a one-dimensional periodic array structure, and the first dielectric layer satisfies that:

$$n_1^2 - (\lambda/P)^2 < 0;$$

when the refractive index of the variable refractive index material is the second refractive index, the periodic array structure with the gaps filled with the variable refractive index material satisfies that:

$$n_{neff}^2 - (\lambda/P)^2 > 0;$$

and satisfies that:

$$n_{neff}^2 - 2(\lambda/P)^2 < 0;$$

where P is a period of the one-dimensional periodic array structure, $\lambda$ is a wavelength of a designated color of light, and $n_1$ is the first refractive index of the first dielectric layer.

In some embodiments, the material of the solid material pattern of the periodic array structure includes titanium dioxide.

In some embodiments, a material of the first dielectric layer includes magnesium fluoride.

In some embodiments, the variable refractive index material is selected from one of an electrically controlled birefringent material, a phase change material and an electrically induced birefringence material.

In some embodiments, the variable refractive index material is one of the electrically controlled birefringent material and the electrically induced birefringence material, and the reflective filter further includes: a first electrode layer located on one side of the first dielectric layer adjacent to the substrate; and a second electrode layer located on one side of the second dielectric layer away from the substrate.

In some embodiments, the reflective filter further includes: a light absorbing layer located between the substrate and the first dielectric layer.

In some embodiments, the reflective filter further includes: a light scattering film located on one side of the second dielectric layer away from the first dielectric layer.

In some embodiments, the reflective filter further includes: a cover plate located on one side of the second dielectric layer away from the first dielectric layer.

In some embodiments, the reflective filter further includes: a first electrode layer located on one side of the first dielectric layer adjacent to the substrate; a second electrode layer located on one side of the second dielectric layer away from the substrate; a light absorbing layer located between the substrate and the first dielectric layer; a cover plate located on one side of the second dielectric layer away from the first dielectric layer; and a light scattering film located on one side of the cover plate adjacent to the second dielectric layer or one side away from the second dielectric layer.

In some embodiments, a material of the periodic array structure includes titanium dioxide, a material of the first dielectric layer includes magnesium fluoride, and the variable refractive index material includes a polymer dispersed liquid crystal material.

According to one aspect of the present disclosure, a display panel is provided. The display panel includes a plurality of pixel units, wherein at least one pixel unit among the plurality of pixel units includes the foregoing reflective filter.

In some embodiments, the plurality of pixel units include a first pixel unit, a second pixel unit and a third pixel unit, and each of the first pixel unit, the second pixel unit and the third pixel unit includes the reflective filter; wherein a periodic array structure of the reflective filter in the first pixel unit has a first period, a first side length and a first thickness, and a reflection peak in a reflection spectrum generated by the periodic array structure of the reflective filter in the first pixel unit corresponds to a first wavelength; a periodic array structure of the reflective filter in the second pixel unit has a second period, a second side length and a second thickness, and a reflection peak in a reflection spectrum generated by the periodic array structure of the reflective filter in the second pixel unit corresponds to a second wavelength; and a periodic array structure of the reflective filter in the third pixel unit has a third period, a third side length and a third thickness, and a reflection peak in a reflection spectrum generated by the periodic array structure of the reflective filter in the third pixel unit corresponds to a third wavelength; and wherein the first period is greater than the second period, the second period is greater than the third period, the first side length is greater than the second side length, the second side length is greater than the third side length, the first thickness is greater than the second thickness, the second thickness is greater than the third thickness, the first wavelength is greater than the second wavelength, and the second wavelength is greater than the third wavelength.

In some embodiments, the first period is 395.2~436.8 nm, the first side length is 197.6~218.4 nm, the first thickness is 55.4~56.6 nm, and the first wavelength is 615~640 nm; the second period is 346.8~383.3 nm, the second side length is 173.6~191.6 nm, the second thickness is 50.8~51.8 nm, and the second wavelength is 540~560 nm; the third period is 280.3~309.8 nm, the third side length is 140.1~154.9 nm, the third thickness is 33.8~34.4 nm, and the third wavelength is 438~470 nm; and the colors of light corresponding to the first wavelength, the second wavelength and the third wavelength respectively constitute three primary colors.

According to one aspect of the present disclosure, a display device is provided. The display device includes the foregoing display panel.

According to one aspect of the present disclosure, a control method of a reflective filter is provided. The reflective filter includes: a substrate, a first dielectric layer located on one side of the substrate and having a first refractive index, a periodic array structure located on one side of the first dielectric layer away from the substrate and in direct contact with the first dielectric layer and a second dielectric layer whose material is a variable refractive index material, the periodic array structure includes a plurality of solid material patterns spaced apart by gaps, the second dielectric layer covers the periodic array structure and fills the gaps, a first refractive index of the first dielectric layer is lower than an equivalent refractive index $n_{neff}$ of the periodic array structure with the gaps filled with the variable refractive index material, and the equivalent refractive index $n_{neff}$ is $$n_{neff} = \sqrt{f \times n_a^2 + (1-f) \times n_v^2}$$

where f is a ratio of a projection area of the solid material pattern of the periodic array structure on the substrate relative to a projection area of an entirety of the periodic array structure on the substrate, $n_a$ is a refractive index of a material of the solid material pattern, and $n_v$ is a refractive index of the variable refractive index material; the control method includes the steps of: in response to the reflective filter receiving a display signal, controlling a refractive index of a variable refractive index material in the reflective filter so that incident light is enabled to form a reflection peak of a designated color light or disenabled to form a reflection peak of a designated color light on a surface of the first dielectric layer adjacent to the periodic array structure, so as to realize a display requirement corresponding to the display signal.

In some embodiments, the variable refractive index material is one of an electronically controlled birefringent material and an electrically induced birefringent material, and the reflective filter further includes: a first electrode layer located on one side of the first dielectric layer adjacent to the substrate and a second electrode layer located on one side of the second dielectric layer away from the substrate; the step of adjusting a refractive index of the variable refractive index material includes: applying a voltage to the first electrode layer and the second electrode layer to form an electric field acting on the variable refractive index material, and changing a voltage value so as to adjust a refractive index of the variable refractive index material under an effect of the electric field.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1:
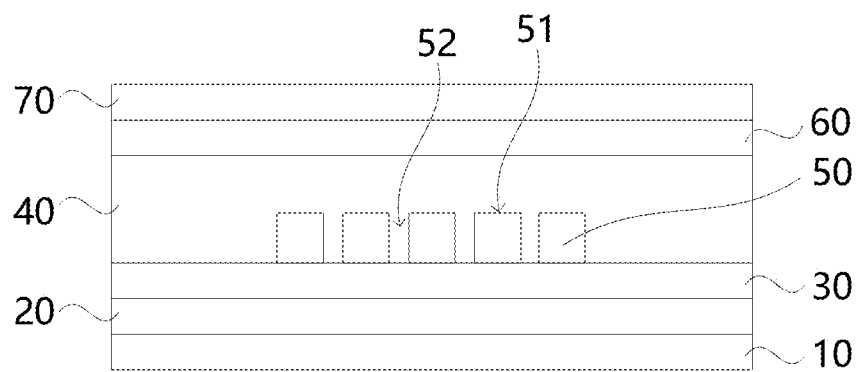
FIG. 1 is a schematic structural view in an embodiment of a reflective filter according to the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noted that, unless otherwise specified, the relative arrangements of the components and steps expounded in these embodiments should be construed as merely illustrative, rather than as a delimitation.

The words "first", "second", and similar words used in the present disclosure do not denote any order, quantity or importance, but merely serve to distinguish different parts. Such similar words as "comprising/including" or "containing" mean that the element preceding the word encompasses the elements enumerated after the word, and does not exclude the possibility of encompassing other elements as well. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

In some related arts, the reflective LCD implements color display by an absorptive color film, and implements gray-scale control by polarizers and liquid crystals. The inventors have discovered through studies that, different assemblies are required to implement color display and gray-scale control of the reflective LCD in the related art, which makes the implementation structure of the display device complicated.

In view of this, the embodiments of the present disclosure provide a display panel, a display device, a reflective filter, and a control method thereof, which can simplify the implementation structure whilst implementing color display and gray-scale control.

FIG. 1 is a schematic structural view in an embodiment of a reflective filter according to the present disclosure.

Referring to FIG. 1, in some embodiments, the reflective filter includes: a substrate 10, a first dielectric layer 30, a periodic array structure 50 and a second dielectric layer 40. The substrate 10 may be made from a supporting material such as glass and ceramics. The first dielectric layer 30 is located on the side of the substrate 10 and has a first refractive index $n_1$. The periodic array structure 50 is located on the side of the first dielectric layer away from the substrate 10 and in direct contact with the first dielectric layer 30. The periodic array structure 50 includes a plurality of solid material patterns 51 spaced apart by gaps 52. The second dielectric layer 40 covers the periodic array structure 50 and fills the gaps 52. The material of the second dielectric layer 40 is a variable refractive index material.

The periodic array structure 50 with the gaps filled with the variable refractive index material has a spectral characteristic, such that the incident light may generate diffraction light having diffraction orders of $0^{th}$ order and $1^{st}$ order on the periodic array structure 50. When the incident light and the periodic array structure 50 with the gaps filled with the variable refractive index material satisfy a wave-vector matching, the guided mode resonance effect occurs to implement redistribution of the optical field. At this time, only the diffraction light having a diffraction order of $1^{st}$ order can propagate within the periodic array structure 50 and perform total reflection on the surface of the first dielectric layer 30 to form a reflection peak. Other diffraction light may be transmitted through the first dielectric layer 30.

In order to allow the incident light and the periodic array structure with the gaps filled with the variable refractive index material to satisfy the wave-vector matching when the variable refractive index material has a certain refractive index, the first refractive index $n_1$ of the first dielectric layer may be made lower than the equivalent refractive index $n_{neff}$ of the periodic array structure with the gaps filled with the variable refractive index material. The first dielectric layer satisfies the propagation condition of the diffraction light having diffraction orders of $0_{th}$ diffraction order, and does not satisfy the propagation condition of the diffraction light having diffraction orders of $1^{st}$ order and above.

The equivalent refractive index $n_{neff}$ may be calculated by the following formula:

$$n_{neff}=\sqrt{f \times n_a^2+(1-f) \times n_v^2},$$

Where f is a ratio of a projection area of the solid material pattern of the periodic array structure on the substrate relative to a projection area of an entirety of the periodic array structure on the substrate, and $n_a$ is a refractive index of the material of the solid material pattern, and $n_v$ is a refractive index of the variable refractive index material.

In some embodiments, the periodic array structure 50 may be a one-dimensional periodic array structure. That is, the solid materials in the periodic array structure 50 are arranged along a straight line to form a one-dimensional solid material pattern. In other embodiments, the periodic array structure 50 may be a two-dimensional periodic array structure. That is, the solid materials in the periodic array structure 50 are arranged along a plane to form a two-dimensional solid material pattern. For example, the solid materials in the two-dimensional periodic array structure are arranged along two directions orthogonal to each other.

In the second dielectric layer 40, the refractive index of the variable refractive index material can be adjusted to a second refractive index $n_2$ or a third refractive index $n_3$. The first dielectric layer and the periodic array structure are configured such that: in the case where the refractive index of the variable refractive index material is the second refractive index, the incident light is enabled to form a reflection peak of a designated color light on a surface of the first dielectric layer adjacent to the periodic array structure. At this time, the periodic array structure with the gaps filled with the variable refractive index material having a second refractive index $n_2$ satisfies the guided mode resonance condition. In the case where the refractive index of the variable refractive index material is the third refractive index, the incident light is disenabled to form a reflection peak of a designated color light on a surface of the first dielectric layer adjacent to the periodic array structure in the case where the refractive index of the variable refractive index material is the third refractive index. At this time, the periodic array structure with the gaps filled with the variable refractive index material having the third refractive index $n_3$ doesn't satisfy the guided mode resonance condition.

In order to improve the reflectance of the reflective filter and achieve a high reflection peak of a designated color, in some embodiments, the periodic array structure with the gaps filled with the variable refractive index material may be configured such that a diffraction order of $1^{st}$ order is satisfied and a diffraction order of $2^{nd}$ order and above is not satisfied when the refractive index of the variable refractive index material is the second refractive index.

For example, for a two-dimensional periodic array structure, when the refractive index of the variable refractive index material is the second refractive index, the diffraction order satisfied by the two-dimensional periodic array structure with the gaps filled with the variable refractive index material is (1,0) mode or (0,1) mode, that is, $$n_{neff}^2 - \left(\frac{\lambda}{Py}\right)^2 > 0 \text{ or } n_{neff}^2 - \left(\frac{\lambda}{Px}\right)^2 > 0,$$

and the diffraction order (1, 1) of a higher order is not satisfied, that is, $$n_{neff}^2 - \left(\frac{\lambda}{Py}\right)^2 - \left(\frac{\lambda}{Px}\right)^2 < 0$$

is satisfied. Px and Py are periods of the two-dimensional periodic array structure in the x direction and the y direction orthogonal to each other, and $\Lambda$ may be a wavelength of a designated color light. Moreover, the diffraction order satisfied by the first dielectric layer 30 is the (0,0) mode, but the (1,0) mode and the (0,1) mode are not satisfied, that is, $n_1^2-(\lambda/Py)^2<0$ and $n_1^2-(\lambda/Px)^2<0$.

As another example, for a one-dimensional periodic array structure, when the refractive index of the variable refractive index material is the second refractive index, the one-dimensional periodic array structure with the gaps filled with the variable refractive index material satisfies that: $n_{neff}^2-(\lambda/P)^2>0$, and $n_{neff}^2-2(\lambda/P)^2<0$. P is a period of the one-dimensional periodic array structure, and $\Lambda$ may be a wavelength of a designated color light. The first dielectric layer 30 satisfies that: $n_1^2-(\lambda/P)^2<0$.

In terms of material selection, the material of the solid material pattern of the periodic array structure 50 may be selected from materials with a high refractive index, for example, including titanium dioxide. The refractive index of the material of the solid material pattern may be higher than a maximum refractive index among at least two refractive indexes that may be adjusted by the variable refractive index material. The material of the first dielectric layer 30 may be selected from materials with a lower refractive index, for example, including magnesium fluoride. The variable refractive index material is selected from materials with a variable refractive index, for example one of electrically controlled birefringent materials, phase change materials, and electrically induced birefringent materials.

For some embodiments in electrically controlled birefringent materials or electrically induced birefringent materials serve as variable refractive index materials, the refractive index of the variable refractive index material may be controlled by voltage. Taking the polymer dispersed liquid crystal (PDLC) material as an example, the rotation angle of liquid crystals may be changed by applying different voltages to both ends of the variable refractive index material, thereby realizing a continuous change of the refractive index between a minimum refractive index and a maximum refractive index. The effect of the guided mode resonance effect of the periodic array structure can be controlled by adjusting the refractive index of the variable refractive index material, thereby simplifying the implementation structure whilst implementing color display and gray-scale control.

The refractive index of the variable refractive index material may be converted into a plurality of refractive indexes when different voltages are applied to the variable refractive index material. The corresponding control method of the reflective filter may include: in response to the reflective filter receiving a display signal, based on the diffraction orders satisfied by the periodic array structure and the first dielectric layer respectively, controlling a refractive index of the variable refractive index material in the reflective filter, and changing the diffraction order satisfied by the periodic array structure with the gaps filled with the variable refractive index material, so as to achieve the display requirements corresponding to the display signal.

The operation of controlling the refractive index may include: adjusting the refractive index of the variable refractive index material to a second refractive index, so that the periodic array structure with the gaps filled with the variable refractive index material satisfies the guided mode resonance condition, so as to implement displaying a bright state of the reflective filter; adjusting the refractive index of the variable refractive index material to a third refractive index, so that the periodic array structure with the gaps filled with the variable refractive index material does not satisfy a guided mode resonance condition, so as to implement displaying a dark state of the reflective filter.

For example, when the refractive index of the variable refractive index material is adjusted to a second refractive index (e.g., a low refractive index state with a refractive index of 1.491), the refractive index parameter is substituted into the formula relating to the diffraction order, so that the above-described condition that $n_{neff}^2-(\lambda/Py)^2>0$ or $n_{neff}^2-(\lambda/Px)^2>0$, and $n_{neff}^2-(\lambda/Py)^2-(\lambda/Px)^2<0$ may be satisfied. At this time, the periodic array structure 50 with the gaps filled with the variable refractive index material may generate a guided mode resonance effect at a designated wavelength, so as to implement displaying a bright state of the color corresponding to the designated wavelength.

When the refractive index of the variable refractive index material is adjusted to a third refractive index (e.g., a high refractive index state with a refractive index of 1.602), the refractive index parameter is substituted into the formula relating to the diffraction order, so that the above-described condition that $n_{neff}^2-(\lambda/Py)^2>0$ or $n_{neff}^2-(\lambda/Px)^2>0$, and $n_{neff}^2-(\lambda/Py)^2-(\lambda/Px)^2<0$ may not be satisfied. At this time, the guided mode resonance effect of the periodic array structure 50 with the gaps filled with the variable refractive index material at a designated wavelength is ruined to a certain extent, to achieve a low reflectance, so that the reflective filter exhibits a dark state. In this way, the reflectance of the reflective filter is adjusted by controlling the refractive index of the variable refractive index material, thereby implementing gray-scale control.

Referring to FIG. 1, in some embodiments, the reflective filter may further include a light absorbing layer 20. The light absorbing layer 20 which is located between the substrate 10 and the first dielectric layer 30, may be configured to absorb visible light that is not reflected, for example diffraction light of other diffraction orders, so as to eliminate interference of visible light that is not reflected by the periodic array structure 50. The light absorbing layer 20 may include a black matrix (BM) and the like. In addition, referring to FIG. 1, the reflective filter may further include a light scattering film 60. The light scattering film 60 may be disposed on one side of the second dielectric layer 40 away from the first dielectric layer 30. The light scattering film 60 may increase the emergent light at a positive viewing angle. In some embodiments, the light-scattering film 60 may effectively enhance the brightness of the emergent light at a positive viewing angle.

Figure 3:
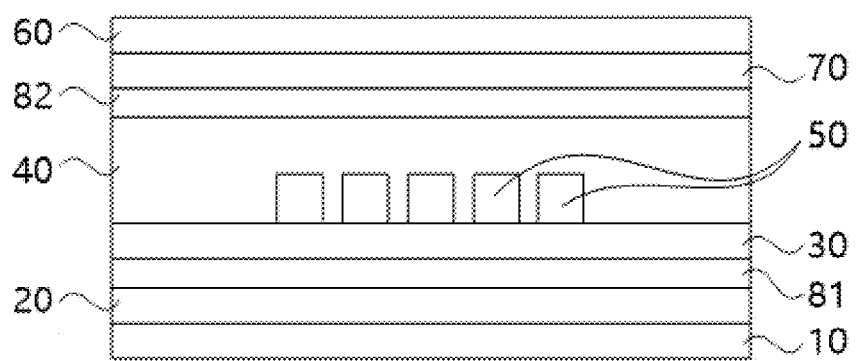
FIG. 3 is a schematic structural view in another embodiment of a reflective filter according to the present disclosure.

In FIG. 1, the reflective filter may further include a cover plate 70. The cover plate 70 which may be disposed on one side of the second dielectric layer 40 away from the first dielectric layer 30, may be selected from a supporting material such as glass. Referring to FIG. 1, in some embodiments, the light scattering film 60 may be disposed on one side of the cover plate 70 adjacent to the second dielectric layer. Referring to FIG. 3, the light scattering film 60 may also be disposed on one side of the cover plate 70 away from the second dielectric layer.

Figure 2:
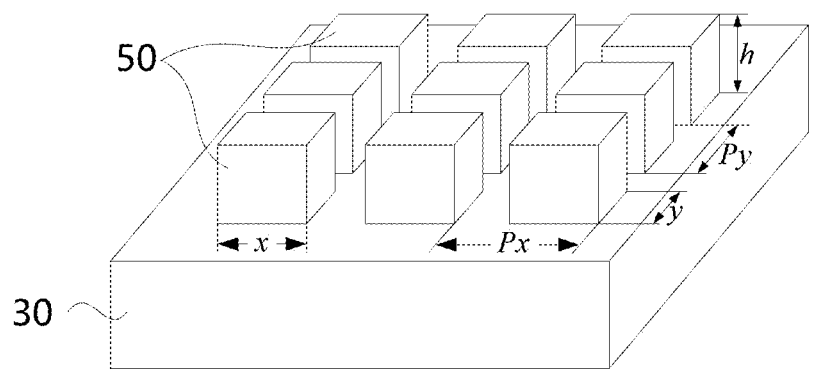
FIG. 2 is a schematic view of parameters of a periodic array structure in an embodiment of a reflective filter according to the present disclosure.

FIG. 2 is a schematic view of parameters of a periodic array structure in an embodiment of a reflective filter according to the present disclosure.

Referring to FIG. 2, in some embodiments, the periodic array structure 50 is a two-dimensional periodic array structure, that is, a plurality of solid material patterns spaced apart by gaps, which are arranged in the form of a two-dimensional periodic array. These solid material patterns are embedded within the variable refractive index material, which is enclosed within the gap. In FIG. 2, for a two-dimensional periodic array structure including a plurality of rectangular parallelepiped solid material patterns, x and y are respectively side lengths of the two-dimensional periodic array structure in the x direction and the y direction, that is, the side lengths of each structural body of the two-dimensional periodic array structure in the x direction and the y direction. Px and Py are periods of the two-dimensional periodic array structure in the x-direction and y-direction, that is, a spaced distance between the positions where adjacent structural bodies of the two-dimensional periodic array structure in the x-direction and y-direction are provided. h is a thickness of the two-dimensional periodic array structure, that is, a thickness of each structural body of the two-dimensional periodic array structure in the direction perpendicular to the xy plane. By designing appropriate parameters of the periodic array structure, high reflection peaks corresponding to colors in different wavelength ranges may be generated.

Based on various embodiments of the above-described reflective filter, the embodiments of the present disclosure also provide a display panel including a plurality of pixel units. The pixel unit includes the foregoing reflective filter. In some embodiments, the reflective filter in the pixel unit may generate a reflection peak corresponding to a color in a designated wavelength range in the reflection spectrum of the incident light.

In order to allow the display panel to achieve a wide color gamut, in some embodiments, a plurality of pixel units include: a first pixel unit, a second pixel unit, and a third pixel unit. The first pixel unit includes a first reflective filter, and the periodic array structure of the first reflective filter has a first period, a first side length, and a first thickness. The reflection peak in the reflection spectrum generated by the periodic array structure corresponds to the first wavelength. The second pixel unit includes a second reflective filter, and the periodic array structure of the second reflective filter has a second period, a second side length, and a second thickness. The reflection peak in the reflection spectrum generated by the periodic array structure corresponds to the second wavelength. The third pixel unit includes a third reflective filter, and the periodic array structure of the third reflective filter has a third period, a third side length, and a third thickness. The reflection peak in the reflection spectrum generated by the periodic array structure corresponds to the third wavelength.

The first wavelength is greater than the second wavelength, and the second wavelength is greater than the third wavelength, when the first period is greater than the second period, the second period is greater than the third period, the first side length is greater than the second side length, the second side length is greater than the third side length, the first thickness is greater than the second thickness, and the second thickness is greater than the third thickness.

The colors of light corresponding to the first wavelength, the second wavelength, and the third wavelength respectively may constitute three primary colors, and the display panel may be made to implement display a plurality of colors by mixing the three primary colors. In other embodiments, more pixel units capable of implementing four primary colors may also be included.

For example, the first period is 395.2~436.8 nm, the first side length is 197.6~218.4 nm, the first thickness is 55.4~56.6 nm, and the first wavelength is 615~640 nm, and the corresponding color light is red light. The second period is 346.8~383.3 nm, the second side length is 173.6~191.6 nm, the second thickness is 50.8~51.8 nm, the second wavelength is 540~560 nm, and the corresponding color light is green light. The third period is 280.3~309.8 nm, the third side length is 140.1~154.9 nm, the third thickness is 33.8~34.4 nm, the third wavelength is 438~470 nm, and the corresponding color light is blue light. In other embodiments, the first wavelength, the second wavelength, and the third wavelength may correspond to yellow, magenta, and cyan.

FIG. 3 is a schematic structural view in another embodiment of a reflective filter according to the present disclosure.

Referring to FIG. 3, in some embodiments, for some embodiments in which an electrically controlled birefringent material or an electrically induced birefringent material serves as a variable refractive index material, the refractive index of the variable refractive index material may be controlled by voltage. Correspondingly, the reflective filter may further include a first electrode layer 81 and a second electrode layer 82. The first electrode layer 81 is located on one side of the first dielectric layer 30 adjacent to the substrate 10. The second electrode layer 82 is located on one side of the second dielectric layer 40 away from the substrate 10. By applying a voltage to the first electrode layer 81 and the second electrode layer 82, an electric field acting on the refractive index material may be formed. By changing the voltage values applied to the first electrode layer 81 and the second electrode layer 82, the refractive index of the variable refractive index material under the effect of the electric field may be adjusted. In FIG. 3, the light scattering film 60 may also be disposed on one side of the cover plate 70 away from the second dielectric layer 40.

Figure 4:
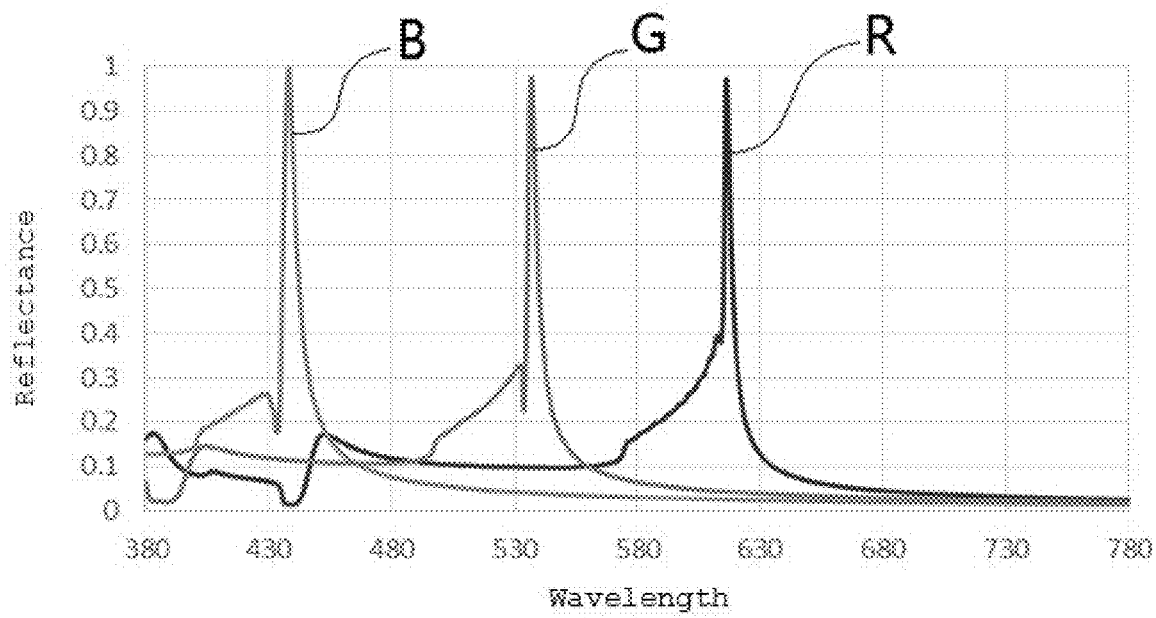
FIG. 4 is a reflection spectrum view respectively corresponding to three primary colors when a guided mode resonance effect is realized in an embodiment of a pixel unit according to the present disclosure.

FIG. 4 is a reflection spectrum view respectively corresponding to three primary colors when a guided mode resonance effect is realized in an embodiment of a pixel unit according to the present disclosure.

In FIG. 4, when the periodic array structure 50 with the gaps filled with the variable refractive index material is subjected to a guided mode resonance, the reflection peak of the spectrum B of the reflection light which is blue light, the reflection peak of the spectrum G of the reflection light which is green light, and the reflection peak of the spectrum R of the reflection light which is red light all exceed 95%.

Figure 5:
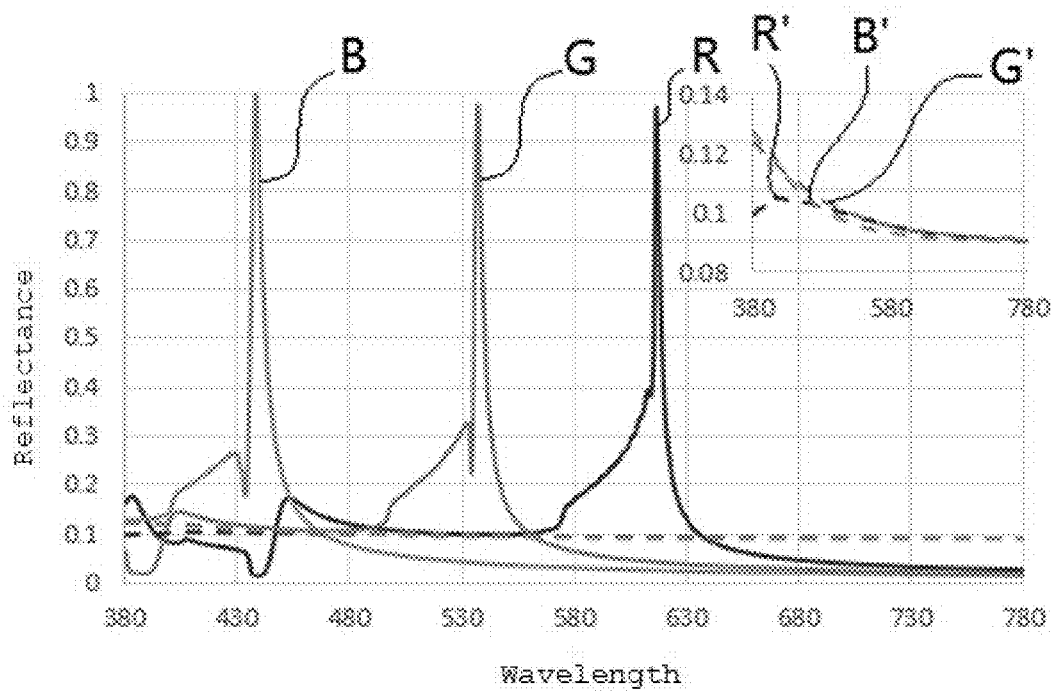
FIG. 5 is a reflection spectrum view in which reflection curves corresponding to three primary colors after a guided mode resonance effect is ruined are superimposed on the basis of FIG. 4.

FIG. 5 is a reflection spectrum view in which reflection curves corresponding to three primary colors after a guided mode resonance effect is ruined are superimposed on the basis of FIG. 4.

In FIG. 5, by adjusting the refractive index of the variable refractive index material, the guided mode resonance of the periodic array structure 50 with the gaps filled with the variable refractive index material may be ruined. At this time, the reflection of the spectrum B' of the reflection light which is blue light, and the reflection of the spectrum G' of the reflection light which is green light, the reflection of the spectrum R' of the reflection light which is red light may be reduced to less than 13%. The gray-scale control of the reflective filter is implemented by controlling from the high reflection peak to the low reflectance. In this way, by adjusting the refractive index of the variable refractive index material of the reflective filter in the pixel unit, it is possible to implement both color display and gray-scale control. Compared with the related art in which different components are required in the reflective LCD to implement color display and gray-scale control, the pixel unit in the embodiments of the present disclosure is more simplified in structure.

The present disclosure also provides a display device including any embodiment of the above-described display panel, such as a mobile phone, a tablet computer, a television, a display, a notebook computer, a digital photo frame, a navigator and any product or member with a display function, which can implement reflective display in a more simplified structure. The above-described reflective filter may also be applied to other fields, such as a lighting device.

Figure 6:
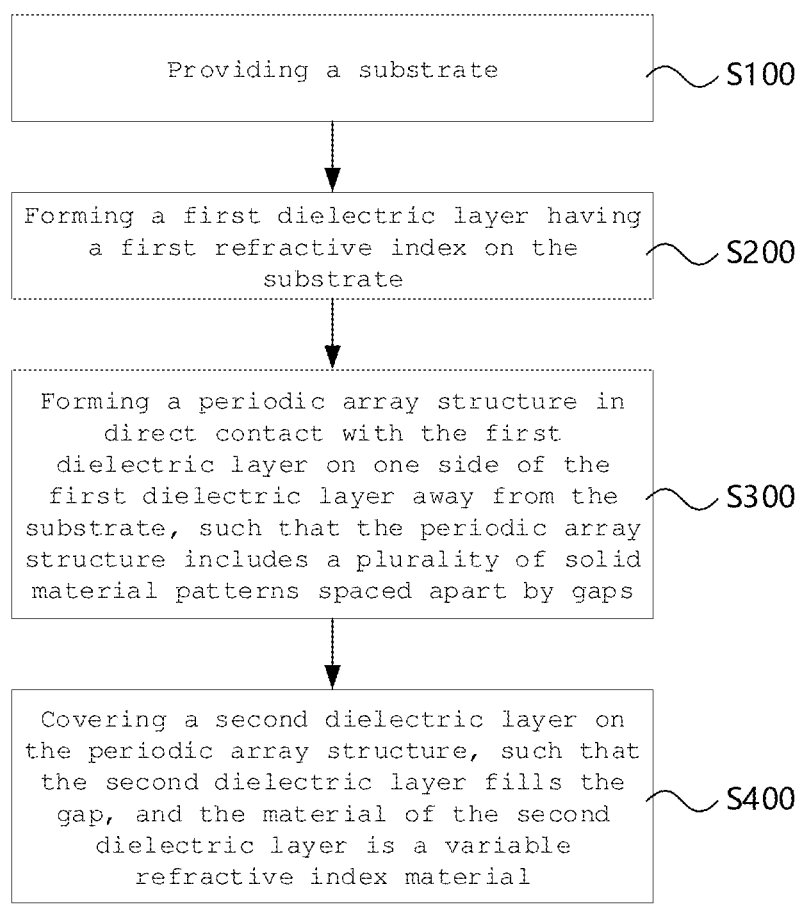
FIG. 6 is a schematic flowchart in an embodiment of a manufacturing method of a reflective filter according to the present disclosure.

FIG. 6 is a schematic flowchart in an embodiment of a manufacturing method of a reflective filter according to the present disclosure.

Referring to FIG. 6, in some embodiments, the manufacturing method of a reflective filter may include steps S100 to S400. In step S100, a substrate 10 is provided. In step S200, a first dielectric layer 30 having a first refractive index is formed on the substrate 10. In step S300, a periodic array structure in direct contact with the first dielectric layer is formed on one side of the first dielectric layer 30 away from the substrate 10, wherein the periodic array structure includes a plurality of solid material patterns spaced apart by gaps.

In step S400, a second dielectric layer is covered on the periodic array structure, and the second dielectric layer fills the gap, and the material of the second dielectric layer is a variable refractive index material. The refractive index of the first dielectric layer is lower than the equivalent refractive index $n_{neff}$ of the periodic array structure with the gaps filled with the variable refractive index material, and the equivalent refractive index $n_{neff}$ is:

$$n_{neff}=\sqrt{f \times n_a^2+(1-f) \times n_v^2},$$

Where f is a ratio of a projection area of the solid material pattern of the periodic array structure on the substrate relative to a projection area of an entirety of the periodic array structure on the substrate, and $n_a$ is a refractive index of the material of the solid material pattern, $n_v$ is a refractive index of the variable refractive index material.

For example, referring to FIG. 3, a liquid crystal material is used as a variable refractive index material. The absorbing layer 20, the first electrode layer 81, the first dielectric layer 30 and the periodic array structure 50 are sequentially formed on the substrate 10, and the scattering film 60 and the second electrode layer 82 are formed on both sides of the cover plate 70. Then, a liquid crystal material is sealed between the cover plate 70 (one side where the second electrode layer 82 is formed) and the substrate 10 on which the absorbing layer 20, the first electrode layer 81, the first dielectric layer 30, and the periodic array structure 50 are formed, so as to form the second dielectric layer 40.

Multiple embodiments in the present description are described in a progressive manner, with different focuses for the respective embodiments which may be subjected to cross-reference for the same or similar portions. For the embodiments of the method, since the method as a whole and the steps involved are in a relationship corresponding to the content in the embodiments of the reflective filter, such embodiments are described in a relatively simple manner. The partial descriptions of the embodiments of the reflective filter may be referred thereto for the relevant aspects.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without departing from the scope and spirit of the present disclosure. The scope of the present disclosure is defined by the appended claims.

What is claimed is:

1. A reflective filter, comprising:
    a substrate;
    a first dielectric layer having a first refractive index and located on one side of the substrate;
    a periodic array structure located on one side of the first dielectric layer away from the substrate and in direct contact with the first dielectric layer, wherein the periodic array structure comprises a plurality of solid material patterns spaced apart by gaps; and
    a second dielectric layer covering the periodic array structure and filling the gaps, wherein a material of the second dielectric layer is a variable refractive index material,
    wherein the first refractive index of the first dielectric layer is lower than an equivalent refractive index $n_{neff}$ of the periodic array structure with the gaps filled with the variable refractive index material, and the equivalent refractive index $n_{neff}$ is $$n_{neff} = \sqrt{f \times n_a^2 + (1-f) \times n_v^2},$$

where f is a ratio of a projection area of the solid material patterns of the periodic array structure on the substrate relative to a projection area of an entirety of the periodic array structure on the substrate, $n_a$ is a refractive index of a material of solid material patterns, and $n_v$ is a refractive index of the variable refractive index material.

2. The reflective filter according to claim 1, wherein the variable refractive index material has a refractive index configured to be adjusted to a second refractive index or a third refractive index, and the first dielectric layer and the periodic array structure are configured such that:
    in the case where a refractive index of the variable refractive index material is the second refractive index, incident light is enabled to form a reflection peak of a designated color light on a surface of the first dielectric layer adjacent to the periodic array structure; and
    in the case where the refractive index of the variable refractive index material is the third refractive index, incident light is disenabled to form a reflection peak of a designated color light on a surface of the first dielectric layer adjacent to the periodic array structure.

3. The reflective filter according to claim 2, wherein the refractive index of the material of the solid material pattern is higher than any one of the second refractive index and the third refractive index.

4. The reflective filter according to claim 2, wherein the periodic array structure is a two-dimensional periodic array structure, and the first dielectric layer satisfies that:

$$n_1^2 - (\lambda/Py)^2 < 0 \text{ and } n_1^2 - (\lambda/Px)^2 < 0;$$

when the refractive index of the variable refractive index material is the second refractive index, the periodic array structure with the gaps filled with the variable refractive index material satisfies that:

$$n_{neff}^2 - (\lambda/Py)^2 > 0 \text{ or } n_{neff}^2 - (\lambda/Px)^2 > 0;$$

and satisfies that:

$$n_{neff}^2 - (\lambda/Py)^2 - (\lambda/Px)^2 < 0;$$

where Px and Py are respectively periods of the two-dimensional periodic array structure in an x direction and a y direction orthogonal to each other, $\lambda$ is a wavelength of a designated color light, and $n_1$ is the first refractive index of the first dielectric layer.

5. The reflective filter according to claim 2, wherein the periodic array structure is a one-dimensional periodic array structure, and the first dielectric layer satisfies that:

$$n_1^2 - (\lambda/P)^2 < 0;$$

when the refractive index of the variable refractive index material is the second refractive index, the periodic array structure with the gaps filled with the variable refractive index material satisfies that:

$$n_{neff}^2 - (\lambda/P)^2 > 0;$$

and satisfies that:

$$n_{neff}^2 - 2(\lambda/P)^2 < 0;$$

where P is a period of the one-dimensional periodic array structure, $\lambda$ is a wavelength of a designated color of light, and $n_1$ is the first refractive index of the first dielectric layer.

6. The reflective filter according to claim 1, wherein the material of the solid material patterns of the periodic array structure comprises titanium dioxide.

7. The reflective filter according to claim 1, wherein a material of the first dielectric layer comprises magnesium fluoride.

8. The reflective filter according to claim 1, wherein the variable refractive index material is selected from one of an electrically controlled birefringent material, a phase change material and an electrically induced birefringence material.

9. The reflective filter according to claim 8, wherein the variable refractive index material is one of the electrically controlled birefringent material and the electrically induced birefringent material, and the reflective filter further comprises:
    a first electrode layer located on one side of the first dielectric layer adjacent to the substrate; and
    a second electrode layer located on one side of the second dielectric layer away from the substrate.

10. The reflective filter according to claim 1, further comprising:
    a light absorbing layer located between the substrate and the first dielectric layer.

11. The reflective filter according to claim 1, further comprising:
    a light scattering film located on one side of the second dielectric layer away from the first dielectric layer.

12. The reflective filter according to claim 1, further comprising:
    a cover plate located on one side of the second dielectric layer away from the first dielectric layer.

13. The reflective filter according to claim 4, further comprising:
    a first electrode layer located on one side of the first dielectric layer adjacent to the substrate;
    a second electrode layer located on one side of the second dielectric layer away from the substrate;
    a light absorbing layer located between the substrate and the first dielectric layer;
    a cover plate located on one side of the second dielectric layer away from the first dielectric layer; and
    a light scattering film located on one side of the cover plate adjacent to the second dielectric layer or one side away from the second dielectric layer.

14. The reflective filter according to claim 13, wherein a material of the periodic array structure comprises titanium dioxide, a material of the first dielectric layer comprises magnesium fluoride, and the variable refractive index material comprises a polymer dispersed liquid crystal material.

15. A display panel comprising a plurality of pixel units, wherein at least one pixel unit among the plurality of pixel units comprises the reflective filter according to claim 1.

16. The display panel according to claim 15, wherein the plurality of pixel units comprise a first pixel unit, a second pixel unit and a third pixel unit, and each of the first pixel unit, the second pixel unit and the third pixel unit comprises the reflective filter;
wherein a periodic array structure of the reflective filter in the first pixel unit has a first period, a first side length and a first thickness, and a reflection peak in a reflection spectrum generated by the periodic array structure of the reflective filter in the first pixel unit corresponds to a first wavelength;
a periodic array structure of the reflective filter in the second pixel unit has a second period, a second side length and a second thickness, and a reflection peak in a reflection spectrum generated by the periodic array structure of the reflective filter in the second pixel unit corresponds to a second wavelength; and
a periodic array structure of the reflective filter in the third pixel unit has a third period, a third side length and a third thickness, and a reflection peak in a reflection spectrum generated by the periodic array structure of the reflective filter in the third pixel unit corresponds to a third wavelength; and
wherein the first period is greater than the second period, the second period is greater than the third period, the first side length is greater than the second side length, the second side length is greater than the third side length, the first thickness is greater than the second thickness, the second thickness is greater than the third thickness, the first wavelength is greater than the second wavelength, and the second wavelength is greater than the third wavelength.

17. The display panel according to claim 16, wherein:
the first period is 395.2~436.8 nm, the first side length is 197.6~218.4 nm, the first thickness is 55.4~56.6 nm, and the first wavelength is 615~640 nm;
the second period is 346.8~383.3 nm, the second side length is 173.6~191.6 nm, the second thickness is 50.8~51.8 nm, and the second wavelength is 540~560 nm;
the third period is 280.3~309.8 nm, the third side length is 140.1~154.9 nm, the third thickness is 33.8~34.4 nm, and the third wavelength is 438~470 nm; and
the colors of light corresponding to the first wavelength, the second wavelength and the third wavelength respectively constitute three primary colors.

18. A display device, comprising:
the display panel according to claim 15.

19. A control method of a reflective filter, wherein the reflective filter comprises: a substrate, a first dielectric layer located on one side of the substrate and having a first refractive index, a periodic array structure located on one side of the first dielectric layer away from the substrate and in direct contact with the first dielectric layer and a second dielectric layer whose material is a variable refractive index material, the periodic array structure comprises a plurality of solid material patterns spaced apart by gaps, the second dielectric layer covers the periodic array structure and fills the gaps, a first refractive index of the first dielectric layer is lower than an equivalent refractive index $n_{neff}$ of the periodic array structure with the gaps filled with the variable refractive index material, and the equivalent refractive index $n_{neff}$ is:

$$n_{neff}=\sqrt{f \times n_a^2+(1-f) \times n_v^2}$$

where f is a ratio of a projection area of the solid material patterns of the periodic array structure on the substrate relative to a projection area of an entirety of the periodic array structure on the substrate, $n_a$ is a refractive index of a material of the solid material patterns, and $n_v$ is a refractive index of the variable refractive index material; the control method comprises the steps of:
in response to the reflective filter receiving a display signal, controlling a refractive index of a variable refractive index material in the reflective filter so that incident light is enabled to form a reflection peak of a designated color light or disenabled to form a reflection peak of a designated color light on a surface of the first dielectric layer adjacent to the periodic array structure, so as to realize a display requirement corresponding to the display signal.

20. The control method according to claim 19, wherein the variable refractive index material is one of an electronically controlled birefringent material and an electrically induced birefringent material, and the reflective filter further comprises: a first electrode layer located on one side of the first dielectric layer adjacent to the substrate and a second electrode layer located on one side of the second dielectric layer away from the substrate; the step of adjusting a refractive index of the variable refractive index material comprises:
applying a voltage to the first electrode layer and the second electrode layer so as to form an electric field acting on the variable refractive index material, and changing a voltage value to adjust a refractive index of the variable refractive index material under an effect of the electric field.

* * * * *